(12) United States Patent
Raszuk et al.

(10) Patent No.: US 8,077,721 B2
(45) Date of Patent: Dec. 13, 2011

(54) METHODS AND APPARATUS PROVIDING TWO STAGE TUNNELING

(75) Inventors: Robert Raszuk, Komorow (PL);
Stefano Previdi, Rome (IT);
Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 1147 days.

(21) Appl. No.: 11/725,157

(22) Filed: Mar. 15, 2007

(65) Prior Publication Data

US 2008/0225852 A1   Sep. 18, 2008

(51) Int. Cl.
*H04L 12/28* (2006.01)

(52) U.S. Cl. .................... 370/392; 370/409; 370/352

(58) Field of Classification Search .................. 370/392, 370/409, 352, 401, 469
See application file for complete search history.

(56) References Cited

U.S. PATENT DOCUMENTS

| | | | |
|---|---|---|---|
| 6,701,361 B1 * | 3/2004 | Meier | 709/224 |
| 6,778,498 B2 * | 8/2004 | McDysan | 370/231 |
| 6,970,459 B1 * | 11/2005 | Meier | 370/389 |
| 6,977,932 B1 * | 12/2005 | Hauck | 370/392 |
| 7,408,941 B2 * | 8/2008 | Martini et al. | 370/395.53 |
| 7,447,151 B2 * | 11/2008 | McDysan | 370/231 |
| 7,483,980 B2 * | 1/2009 | Thomas | 709/225 |
| 7,590,074 B1 | 9/2009 | Dondeti et al. | 370/254 |
| 7,594,032 B2 * | 9/2009 | Thomas | 709/246 |
| 7,836,205 B2 * | 11/2010 | Thomas | 709/245 |
| 2006/0039391 A1 * | 2/2006 | Vasseur et al. | 370/409 |
| 2006/0098587 A1 * | 5/2006 | Vasseur et al. | 370/254 |
| 2006/0098657 A1 * | 5/2006 | Vasseur et al. | 370/392 |
| 2006/0101142 A1 * | 5/2006 | Vasseur et al. | 709/225 |
| 2006/0133265 A1 | 6/2006 | Lee | 370/228 |
| 2006/0291445 A1 * | 12/2006 | Martini et al. | 370/351 |

* cited by examiner

*Primary Examiner* — Dang Ton
*Assistant Examiner* — Brian O Connor
(74) *Attorney, Agent, or Firm* — Brinks Hofer Gilson & Lione

(57) ABSTRACT

A system receives a packet at a first node. The packet is destined for a second node. The system identifies a full routing node from a plurality of network devices. The full routing node is capable of providing routing information for each of the nodes within the plurality of network devices. The plurality of network devices comprises a subset of nodes, and a subset of full routing nodes. The subset of nodes is not capable of providing routing information for each of the nodes within the plurality of network devices. The system transmits the packet to the full routing node for future transmission to the second node.

20 Claims, 9 Drawing Sheets

210 IDENTIFY A FULL ROUTING NODE FROM A PLURALITY OF NETWORK DEVICES, THE FULL ROUTING NODE CAPABLE OF PROVIDING ROUTING INFORMATION FOR EACH OF THE NODES WITHIN THE PLURALITY OF NETWORK DEVICES, THE PLURALITY OF NETWORK DEVICES COMPRISING A SUBSET OF NODES AND A SUBSET OF FULL ROUTING NODES, THE SUBSET OF NODES NOT CAPABLE OF PROVIDING ROUTING INFORMATION FOR EACH OF THE NODES WITHIN THE PLURALITY OF NETWORK DEVICES

211 IDENTIFY THE SUBSET OF FULL ROUTING NODES CAPABLE OF PROVIDING ROUTING INFORMATION TO THE PLURALITY OF NETWORK DEVICES

212 SELECT A PREFERRED FULL ROUTING NODE FROM THE SUBSET OF FULL ROUTING NODES

FIG. 6

212 SELECT A PREFERRED FULL ROUTING NODE FROM THE SUBSET OF FULL ROUTING NODES

OR

213 IDENTIFY THE PREFERRED FULL ROUTING NODE BASED ON A PROXIMITY OF THE PREFERRED FULL ROUTING NODE WITH THE FIRST NODE

OR

214 IDENTIFY THE PREFERRED FULL ROUTING NODE BASED ON A LEVEL OF TRAFFIC ASSOCIATED WITH THE PREFERRED FULL ROUTING NODE

OR

215 IDENTIFY THE PREFERRED FULL ROUTING NODE BASED ON A LEVEL OF TRAFFIC EXISTING BETWEEN THE FIRST NODE AND THE PREFERRED FULL ROUTING NODE

OR

216 IDENTIFY THE PREFERRED FULL ROUTING NODE BASED ON LOAD BALANCING AMONG THE SUBSET OF FULL ROUTING NODES

FIG. 7

221 TRANSMIT THE PACKET TO THE FULL ROUTING NODE FOR FUTURE TRANSMISSION TO THE SECOND NODE

222 CREATE A HEADER FOR THE PACKET, THE HEADER INDICATING AN INTERIM DESTINATION OF THE PACKET, THE FULL ROUTING NODE IDENTIFIED AS THE INTERIM DESTINATION

FIG. 9

METHODS AND APPARATUS PROVIDING TWO STAGE TUNNELING

BACKGROUND

Computer networks typically provide a physical interconnection between different computers to allow convenient exchange of programs and data. A plurality of connectivity devices, such as switches and routers, interconnect each user computer connected to the network. The connectivity devices maintain routing information about the computers and perform routing decisions concerning message traffic passed between the computers via the connectivity devices. Each connectivity device, or router, corresponds to a network routing prefix indicative of the other computers, which it has direct, or indirect access to. Therefore, data routed from one computer to another follows a path through the network defined by the routers between the two computers.

The routers define nodes in a network, and data travels between the nodes in a series of so-called "hops" over the network. Since each router is typically connected to multiple other routers, there may be multiple potential paths between given computers. Typically, the routing information is employed in a routing table in each router, which is used to determine a path to a destination computer or network. The router makes a routing decision, using the routing table, to identify the next "hop," or next router, to send the data to in order for it to ultimately reach the destination computer.

A Virtual Private Network (VPN) is a network that uses a public telecommunication infrastructure, such as the Internet, to provide remote offices or individual users with secure access to their organization's network. A VPN works by using the shared public infrastructure while maintaining privacy through security procedures and tunneling protocols.

VPNs provide a secured means for transmitting and receiving data between network nodes even though a corresponding physical network supporting propagation of the data is shared by many users. Typically, the data transmitted between such network nodes (e.g., provider edge nodes of a service provider network) is encrypted to protect against eavesdropping and tampering by unauthorized parties.

One type of VPN is known as a 2547 based VPN, which allows a customer to offer VPN service using the notion of a Virtual Routing and Forwarding (VRF) instance. PE routers typically maintain VRF information in a table (a VRF table) dictating how to route and forward traffic through the shared physical network to support corresponding VPNs for the different customers. In 2547 VPNs, PE routers advertise VPN prefixes and labels (VPN_LABEL) for these prefixes using Multi-Protocol Border Gateway Protocol (MP-BGP) in the control plane. In the forwarding plane, when an IP packet arrives into a VRF, the packet is appended with two labels (e.g., an Internal Gateway Protocol label (IGP_LABEL) and a VPN_LABEL). The IGP_LABEL gets the packet to the far end PE. The VPN_LABEL associates the packet with the outgoing interface on the far end PE. 2547 VPNs inherently allow for "any2any" connectivity for a scalable VPN solution to connect thousands of sites. Many large enterprises are using 2547 VPNs for segmentation. An interconnection between the sub networks of a VPN, therefore, typically includes one or more core networks. Each of the core networks is usually one or many autonomous systems (AS), meaning that it employs and enforces a common routing policy among the nodes (routers) included therein.

Typically, nodes designated as a provider edge (PE) router must carry all possible packet destinations in order to be able to properly forward packets to the routers within an autonomous system (AS). Provider edge routers must also be capable of encapsulating the packets (via MPLS, IP, GRE, etc), and establishing tunnels among provider edge (PE) routers and enabling both MPLS and IPSec on those tunnels.

SUMMARY

Conventional technologies for node to node traffic within the Internet suffer from a variety of deficiencies. In particular, conventional technologies for node to node traffic within the Internet are limited in that provider edge (PE) routers must store all the necessary Border Gateway Protocol (BGP) information to properly route packets within an autonomous system (AS). As networks grow larger, the ability to scale provider edge (PE) routers causes problems since provider edge (PE) routers may be limited with respect to CPU and memory resources.

Embodiments disclosed herein significantly overcome such deficiencies and provide a system that includes a two phased packet routing process that relieves the provider edge (PE) routers of the burden of maintaining all the necessary Border Gateway Protocol (BGP) information to properly route packets. According to embodiments disclosed herein, within an autonomous system (AS), a subset of the network devices (i.e., full routing nodes), not including the provider edge (PE) routers, are configured with full routing information. When a packet arrives at a provider edge (PE) router, the provider edge (PE) router identifies one of the full routing nodes, and transmits the packet to that full routing node using a tunneling mechanism (thus, the intermediate nodes along the path to the full routing nodes do not require the full routing table). The full routing node performs an IP look up to obtain routing information, establishes a tunnel, and forwards the packet toward the destination. The network devices (i.e., nodes) that are not configured as full routing nodes are configured only to know the tail-end tunnel destination information. Embodiments disclosed herein limit the number of routers where the full BGP information is required, without requiring more resources than are currently implemented. Embodiments disclosed herein allow better scaling of provider edge (PE) routers within large networks. By removing the responsibility from the provider edge (PE) routers of providing full routing information, fewer resources of the provider edge (PE) routers are used for routing. This allows, for example, more classification activity on provider edge (PE) routers, and reduces resources requirements such as memory.

In an example embodiment, the provider edge (PE) router and all nodes are configured to know which nodes are full routing nodes. The node that receives the packet, (typically the provider edge (PE) router) must determine which full routing node to which to forward the packet. The packet routing process identifies all the full routing nodes within the network, and then selects the preferred full routing node. In an example embodiment, the preferred full routing node is the closest full routing node (to the node that initially receives the packet). In another example embodiment, the preferred full routing node is the full routing node that has less traffic than, for example, the closest full routing node. In another example embodiment, the preferred full routing node is determined by level of congestion, or the propagation delay of the path between the node at which the packet is received, and the preferred full routing node. In yet another example embodiment, the packet routing process performs load balancing to identify the preferred full routing node(s), and may decide to load balance the traffic across a set of full routing nodes for example on a per-destination prefix basis.

In an example embodiment, the full routing nodes advertise their capabilities via a router capability TLV (type-length-value) notification. The full routing nodes notify the nodes (i.e., the non full routing nodes) which full routing nodes are capable of providing full routing information. The TLV notification may include, for example, a flag indicating the full routing node is capable of providing full routing information. In another example embodiment, the TLV notification may also contains a watermark, indicating the ability of the full routing node to handle additional packet traffic. For example, the watermark may indicate a percentage of traffic level or resource consumption (e.g. memory, processor usage, etc.) on that full routing node. A node (i.e., a non full routing node) may select a preferred full routing node, based on that full routing node's ability to handle additional traffic. In yet another example embodiment, the full routing nodes periodically update their status by sending TLV notifications to the nodes (i.e., a non full routing nodes) using thresholds to avoid oscillations.

After identifying the preferred full routing node, the packet routing process creates a header for the packet, and transmits the packet to the preferred full routing node using a tunnel (e.g. IP or MPLS). In an example embodiment, the packet routing process receives the packet at a full routing node. The full routing node encapsulates the packet with a header, directing the packet toward the second node, and then transmits the packet to the second node.

To prevent an endless looping process of multiple full routing nodes repeatedly encapsulating a packet, when a packet arrives at a full routing node, the full routing node examines the packet. The knowledge of the full routing table guarantees that the packet is then encapsulated within a tunnel to the exit point using a tunnel technique. Upon receiving a packet, a full routing node inspects the destination, and routes the packet accordingly. If the packet has already been encapsulated, the full routing node does not encapsulate the packet, rather, the full routing node continues to forward the packet along the tunnel toward the destination of the packet, according to the header on the packet (provided by the full routing node that encapsulated the packet).

In an example embodiment, the route reflector provides full routing information to a request that originates from outside the autonomous system (AS).

Embodiments disclosed herein provide a system that includes a packet routing process. The packet routing process receives a packet at a first node. The packet is destined for a second node. The packet routing process identifies a full routing node from a plurality of network devices. The full routing node is capable of providing routing information for each of the nodes within the plurality of network devices. The plurality of network devices comprises a subset of nodes, and a subset of full routing nodes. The subset of nodes is not capable of providing routing information for each of the nodes within the plurality of network devices. The packet routing process transmits the packet to the full routing node for future transmission to the second node.

During an example operation of one embodiment, suppose a packet arrives at a provider edge (PE) router. The packet routing process, operating on the provider edge (PE) router, identifies the subset of full routing nodes that a capable of providing full routing information to the provider edge (PE) router. The packet routing process, operating on the provider edge (PE) router, determines that the closest full routing node is the preferred full routing node, establishes a tunnel and transmits the packet to that full routing node using that tunnel. The full routing node receives the packet from the provider edge (PE) router, establishes a tunnel between the full routing node and the destination of the packet, and then transmits the packet along the tunnel toward the destination.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied as a computer readable medium encoded with a software program, as software and hardware, or as hardware alone. The features, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 6 illustrates a flowchart of a procedure performed by the system of FIG. 1 when the packet routing process identifies a full routing node from a plurality of network devices, according to one embodiment disclosed herein.

FIG. 7 illustrates a flowchart of a procedure performed by the system of FIG. 1 when the packet routing process selects a preferred full routing node from the subset of full routing nodes, according to one embodiment disclosed herein.

FIG. 9 illustrates a flowchart of a procedure performed by the system of FIG. 1 when the packet routing process transmits the packet to the full routing node for future transmission to the second node, according to one embodiment disclosed herein.

DETAILED DESCRIPTION

Figure 1:
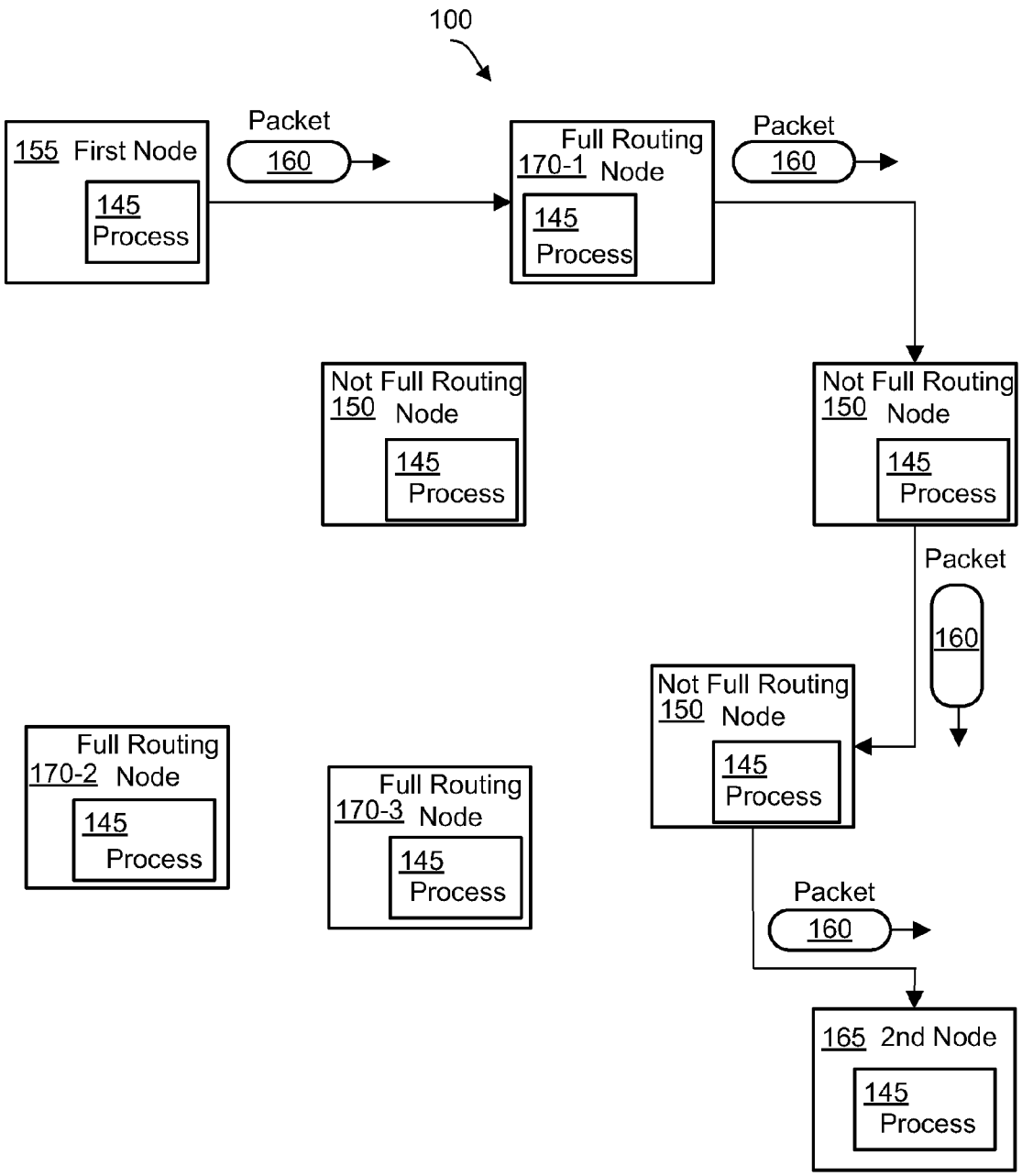
FIG. 1 shows a high level view of a network wherein a packet routing process routes packets, according to one embodiment disclosed herein.

Embodiments disclosed herein provide a system that includes a two phased packet routing process that relieves the provider edge (PE) routers of the burden of maintaining all the necessary Border Gateway Protocol (BGP) information to properly route packets. According to embodiments disclosed herein, within an autonomous system (AS), a subset of the network devices (i.e., full routing nodes), not including the provider edge (PE) routers, are configured with full routing information. When a packet arrives at a provider edge (PE) router, the provider edge (PE) router identifies one of the full routing nodes, and transmits the packet to that full routing node using a tunneling mechanism (thus, the intermediate nodes along the path to the full routing nodes do not require the full routing table). The full routing node performs an IP look up to obtain routing information, establishes a tunnel, and forwards the packet toward the destination. The network devices (i.e., nodes) that are not configured as full routing nodes are configured only to know the tail-end tunnel destination information. Embodiments disclosed herein limit the number of routers where the full BGP information is required, without requiring more resources than are currently implemented. Embodiments disclosed herein allow better scaling of provider edge (PE) routers within large networks. By removing the responsibility from the provider edge (PE) routers of providing full routing information, fewer resources of the provider edge (PE) routers are used for routing. This allows, for example, more classification activity on provider edge (PE) routers, and reduces resources requirements such as memory.

In an example embodiment, the provider edge (PE) router and all nodes are configured to know which nodes are full routing nodes. The node that receives the packet, (typically the provider edge (PE) router) must determine which full routing node to which to forward the packet. The packet routing process identifies all the full routing nodes within the network, and then selects the preferred full routing node. In an example embodiment, the preferred full routing node is the closest full routing node (to the node that initially receives the packet). In another example embodiment, the preferred full routing node is the full routing node that has less traffic than, for example, the closest full routing node. In another example embodiment, the preferred full routing node is determined by level of congestion, or the propagation delay of the path between the node at which the packet is received, and the preferred full routing node. In yet another example embodiment, the packet routing process performs load balancing to identify the preferred full routing node(s), and may decide to load balance the traffic across a set of full routing nodes for example on a per-destination prefix basis.

In an example embodiment, the full routing nodes advertise their capabilities via a router capability TLV (type-length-value) notification. The full routing nodes notify the nodes (i.e., the non full routing nodes) which full routing nodes are capable of providing full routing information. The TLV notification may include, for example, a flag indicating the full routing node is capable of providing full routing information. In another example embodiment, the TLV notification may also contains a watermark, indicating the ability of the full routing node to handle additional packet traffic. For example, the watermark may indicate a percentage of traffic level or resource consumption (e.g. memory, processor usage, etc.) on that full routing node. A node (i.e., a non full routing node) may select a preferred full routing node, based on that full routing node's ability to handle additional traffic. In yet another example embodiment, the full routing nodes periodically update their status by sending TLV notifications to the nodes (i.e., a non full routing nodes) using thresholds to avoid oscillations.

After identifying the preferred full routing node, the packet routing process creates a header for the packet, and transmits the packet to the preferred full routing node using a tunnel (e.g. IP or MPLS). In an example embodiment, the packet routing process receives the packet at a full routing node. The full routing node encapsulates the packet with a header, directing the packet toward the second node, and then transmits the packet to the second node.

To prevent an endless looping process of multiple full routing nodes repeatedly encapsulating a packet, when a packet arrives at a full routing node, the full routing node examines the packet. The knowledge of the full routing table guarantees that the packet is then encapsulated within a tunnel to the exit point using a tunnel technique. Upon receiving a packet, a full routing node inspects the destination, and routes the packet accordingly. If the packet has already been encapsulated, the full routing node does not encapsulate the packet, rather, the full routing node continues to forward the packet along the tunnel toward the destination of the packet, according to the header on the packet (provided by the full routing node that encapsulated the packet).

In an example embodiment, the route reflector provides full routing information to a request that originates from outside the autonomous system (AS).

Embodiments disclosed herein provide a system that includes a packet routing process. The packet routing process receives a packet at a first node. The packet is destined for a second node. The packet routing process identifies a full routing node from a plurality of network devices. The full routing node is capable of providing routing information for each of the nodes within the plurality of network devices. The plurality of network devices comprises a subset of nodes, and a subset of full routing nodes. The subset of nodes is not capable of providing routing information for each of the nodes within the plurality of network devices. The packet routing process transmits the packet to the full routing node for future transmission to the second node.

FIG. 1 illustrates an example computer-networking environment 100 suitable for use in explaining example embodiments disclosed herein. A first node 155, operating the packet routing process 145-2, receives a packet 160 that is destined for a second node 165. The first node identifies a full routing node 170 (also operating the packet routing process 145-2), establishes a tunnel, and transmits the packet 160 to the full routing node 170. The full routing node 170 receives the packet 160, and establishes a tunnel between the full routing node 170 and the second node 165 (also operating the packet routing process 145-2). The tunnel between the full routing node 170 and the second node 165 passes through a plurality of nodes 150 (each also operating the packet routing process 145-2) that are not capable of providing full routing information. Each node 150 and each full routing node 170 within the computer-networking environment 100 operate an instance of the packet routing process 145-2.

Figure 2:
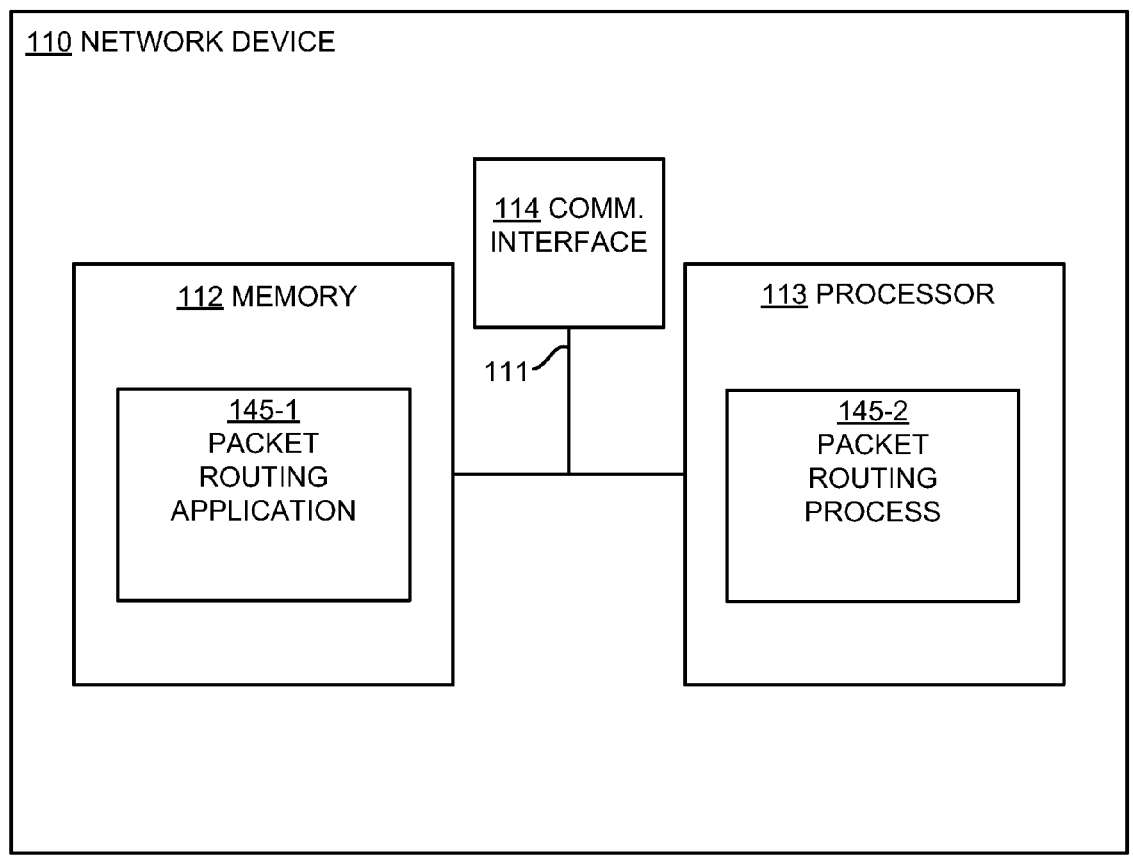
FIG. 2 shows a block diagram of a computer system according to one embodiment disclosed herein.

FIG. 2 illustrates an example architecture of a network device 110. The network device 110 may be any type of computerized device such as a personal computer, workstation, portable computing device, console, laptop, network terminal or the like. It should be noted that the definition of network device 110 encompasses a first node 155, a second node 165, full routing nodes 170 and nodes 150 (i.e., non full routing nodes) as explained within FIG. 1. In this example, the network device 110 includes an interconnection mechanism 111 that couples a memory system 112, a processor 113, and a communications interface 114. The communications interface 114 enables the network device 110 to communicate with other devices (i.e., other computers) on a network (not shown). This can allow access to the packet routing application 145-1 by remote computer systems.

The memory system 112 may be any type of computer readable medium that is encoded with an packet routing application 145-1 that may be embodied as software code such as data and/or logic instructions (e.g., code stored in the memory or on another computer readable medium such as a removable disk) that supports processing functionality according to different embodiments described herein. During operation of the network device 110, the processor 113 accesses the memory system 112 via the interconnect 111 in order to launch, run, execute, interpret or otherwise perform the logic instructions of the packet routing application 145-1. Execution of the packet routing application 145-1 in this manner produces processing functionality in a packet routing process 145-2. In other words, the packet routing process 145-2 represents one or more portions of runtime instances of the packet routing application 145-1 (or the entire application 145-1) performing or executing within or upon the processor 113 in the network device 110 at runtime. It is to be understood that embodiments disclosed herein include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments disclosed herein can provide the applications operating within the processor 113 as the processes. While not shown in this example, those skilled in the art will understand that the computer system may include other processes and/or software and hardware components, such as an operating system, that have been left out of this illustration for ease of description.

Further details of configurations explained herein will now be provided with respect to a flow chart of processing steps that show the high level operations disclosed herein to perform the packet routing process 145-2.

Figure 3:
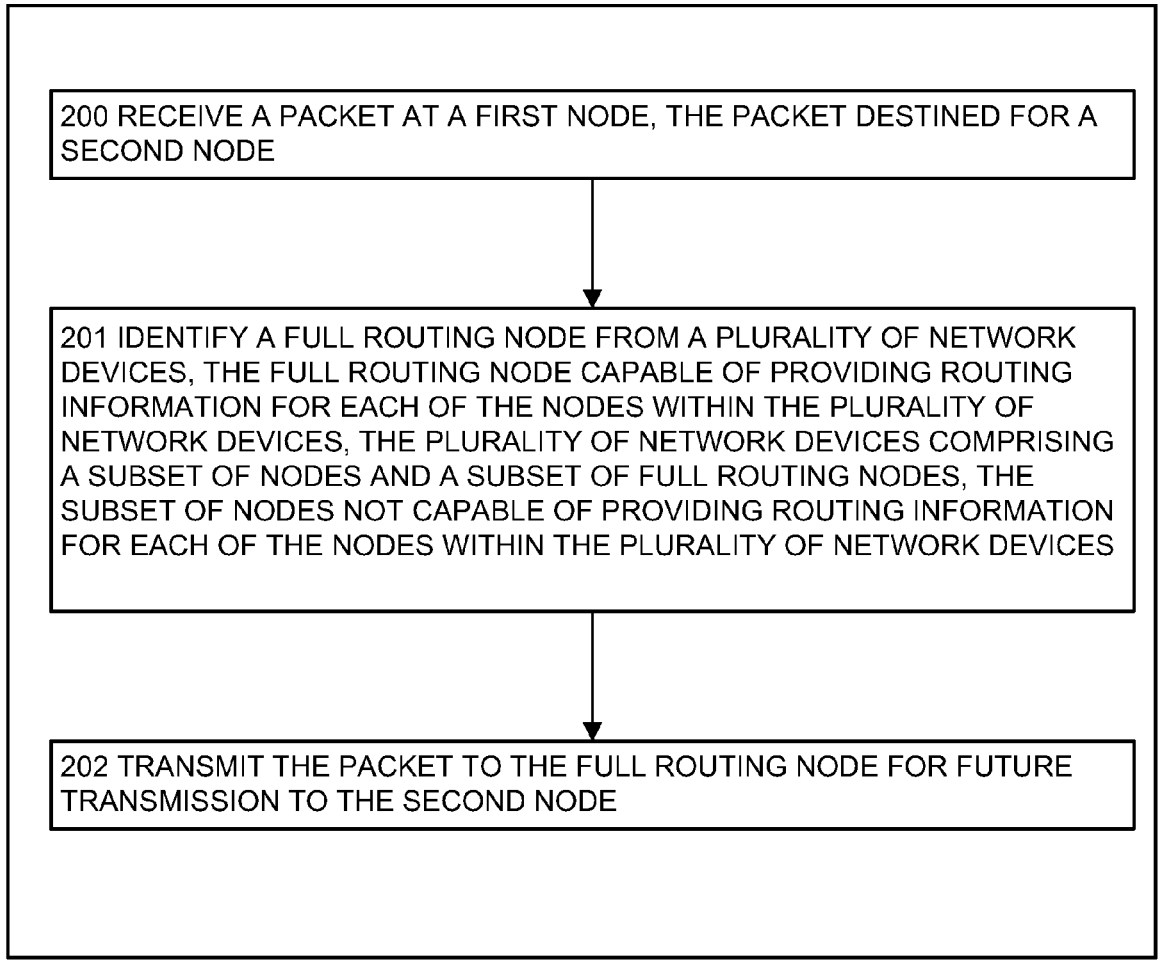
FIG. 3 illustrates a flowchart of a procedure performed by the system of FIG. 1 when the packet routing process receives a packet at a first node, the packet destined for a second node, according to one embodiment disclosed herein.

FIG. 3 is a flowchart of the steps performed by the packet routing process 145-2 when it receives a packet 160, at a first node 155, that is destined for a second node 165.

In step 200, the packet routing process 145-2 receives a packet at a first node 155. The packet 160 is destined for a second node 165. In an example embodiment, the first node 155 is a provider edge (PE) router, and the packet 160 arrives at the provider edge (PE) router. The provider edge (PE) router is not configured with full routing information so as to save resources on the provider edge (PE) router. However the provider edge (PE) router has been notified which network devices 110 are configured with full routing information (i.e., full routing node 170). In an example embodiment, the provider edge (PE) router is configured with only next hop information.

In step 201, the packet routing process 145-2 identifies a full routing node from a plurality of network devices 110. The full routing node 170 is capable of providing routing information for each of the nodes 150 within the plurality of network devices 110. The plurality of network devices 110 is comprised of a subset of nodes 150, and a subset of full routing nodes 170. The subset of nodes 150 is not capable of providing routing information for each of the nodes 150 within the plurality of network devices 110.

In step 202, the packet routing process 145-2 transmits the packet 160 to the full routing node 170 for future transmission to the second node 165. The packet routing process 145-2 is a two phase process wherein a node 150 receives a packet 160, and transmits the packet 160 to a full routing node 170 (the first phase of the two phase process). In an example embodiment, the node 150 (receiving the packet 160) is a provider edge (PE) router. The provider edge (PE) router establishes a tunnel between the provider edge (PE) router and the full routing node 170. The tunnel between the provider edge (PE) router and the full routing node 170 may also pass through other nodes 150 that are not configured with full routing information. The full routing node 170 establishes a tunnel (between the full routing node 170 and the second node 165), and transmits the packet 160 toward the second node 165 (the second phase of the two phase process). To establish a tunnel between the full routing node 170 and the second node 165, a secure, encrypted connection is established using a secure connection.

Then, either an IPSec session or an SSL session with Security Associations (SAs) is established, resulting in the secure tunnel. A Security Association is an association that specifies security properties from one peer to another peer. Once the tunnel has been established, the full routing node 170, or the second node 165 is able to send encrypted traffic over the tunnel using IPSec or SSL, depending on the protocol used to establish the tunnel.

Figure 4:
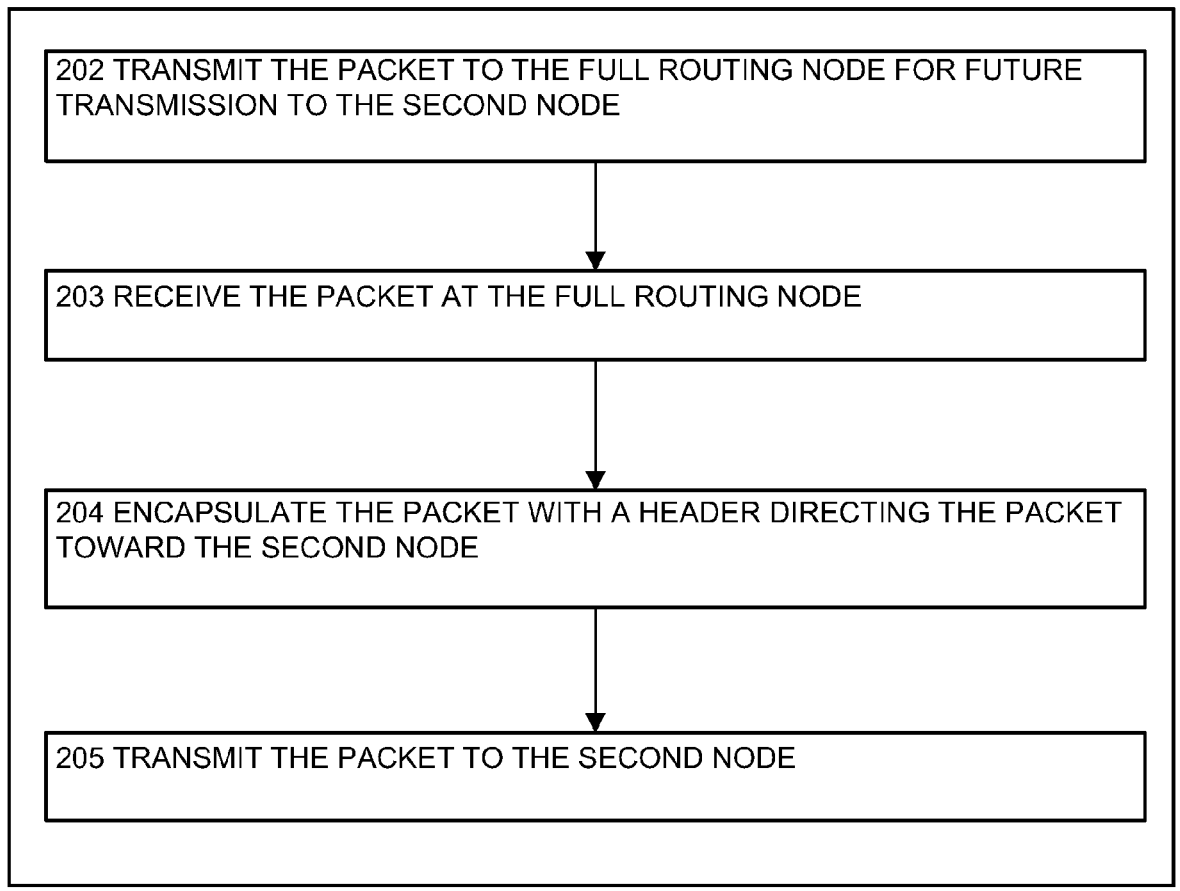
FIG. 4 illustrates a flowchart of a procedure performed by the system of FIG. 1 when the packet routing process transmits the packet to the full routing node for future transmission to the second node, according to one embodiment disclosed herein.

FIG. 4 is a continuation of FIG. 3 of a flowchart of the steps performed by the packet routing process 145-2 when (as stated above in step 202) it transmits the packet 160 to the full routing node 170 for future transmission to the second node 165.

In step 203, the packet routing process 145-2 receives the packet 160 at the full routing node 170. The full routing node 170 is equipped with routing information for each of the nodes 150 within the plurality of network devices 110. The nodes 150 are only equipped with next hop information.

In step 204, the packet routing process 145-2 encapsulates the packet 160 with a header directing the packet toward the second node 165. The packet routing process 145-2, operating on the full routing node 170, establishes a tunnel between the full routing node 170 and the second node 165.

In step 205, the packet routing process 145-2 transmits the packet 160 to the second node 165 using the tunnel established between the full routing node 170 and the second node 165. As the packet 160 passes through nodes 150, those nodes 150 simply pass the packet 160 through, toward the second node 165, according to the header associated with the packet 160.

Figure 5:
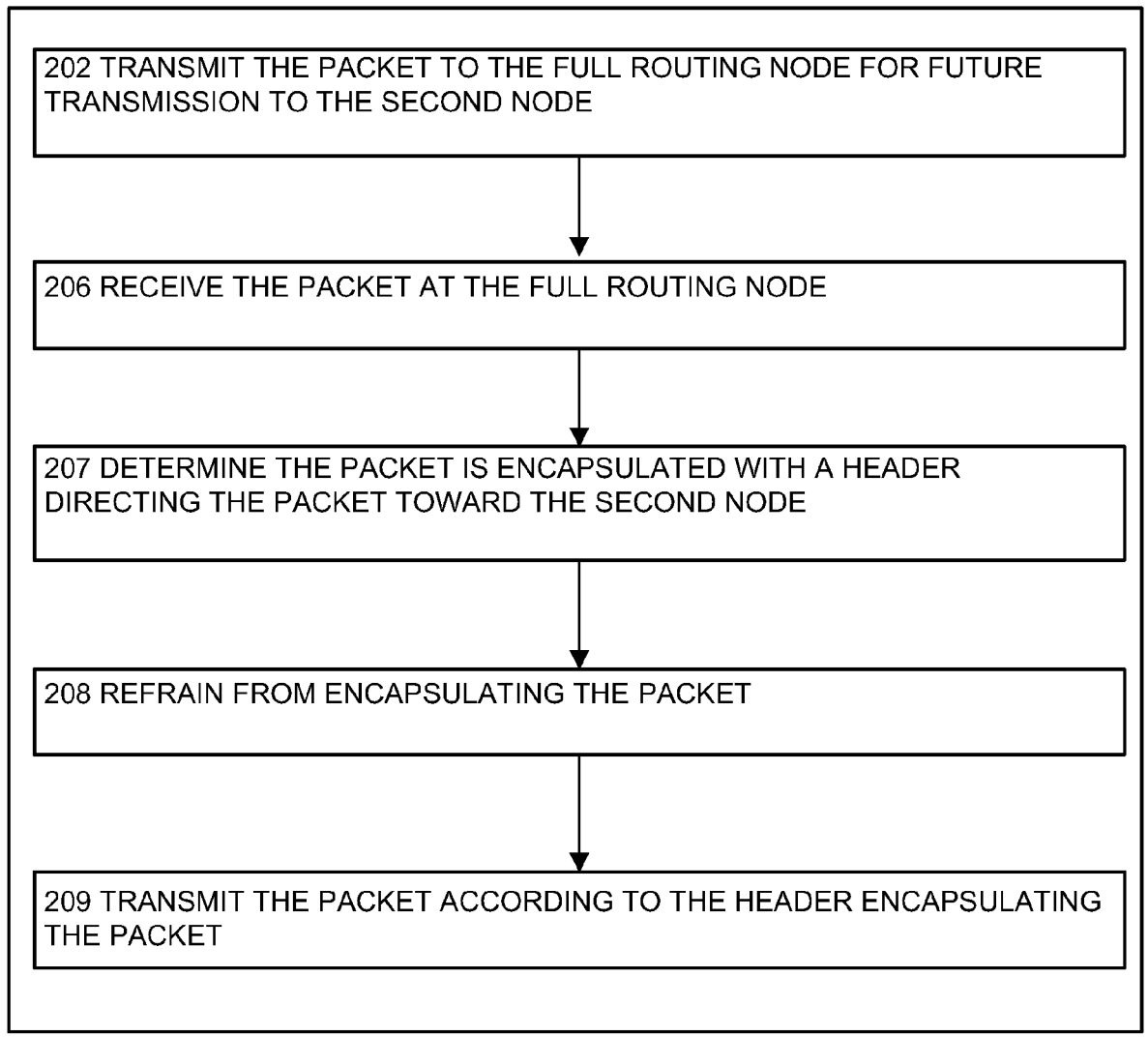
FIG. 5 illustrates a flowchart of a procedure performed by the system of FIG. 1 when the packet routing process transmits the packet to the full routing node for future transmission to the second node, and receives the packet at the full routing node, according to one embodiment disclosed herein.

FIG. 5 is a continuation of FIG. 3 of a flowchart of the steps performed by the packet routing process 145-2 when (as stated above in step 202) it transmits the packet 160 to the full routing node 170 for future transmission to the second node 165.

In step 206, the packet routing process 145-2 receives the packet 160 at the full routing node 170-2. In an example embodiment, the packet 160 has already been received at a first full routing node 170-1, encapsulated with a header and tunneled toward the second node 165. During the tunneling (from the first full routing node 170-1 toward the second node 165), the packet 160 is received at a second full routing node 170-2. In an example embodiment, the second node 165 may be an exit node from the Autonomous System (AS), or may be another full routing node within that Autonomous Domain.

In step 207, the packet routing process 145-2 determines the packet 160 is encapsulated with a header directing the packet 160 toward the second node 165. In an example embodiment, a node 150, such as a provider edge (PE) router, establishes a tunnel between the provider edge (PE) router, and the full routing node 170. The tunnel between the provider edge (PE) router, and the full routing node 170 may pass through other nodes 150 (that do not have full routing information). In an example embodiment, those nodes 150 only see an IP packet destined for the full routing node 170. In another example embodiment, such as when an MPLS tunnel is established, those nodes 150 will only label switch a packet without looking at the IP packet inside the tunnel.

The packet routing process 145-2, operating on the second full routing node 170-2, determines that the first full routing node 170-1 has already encapsulated the packet 160.

In step 208, the packet routing process 145-2 refrains from encapsulating the packet 160. To prevent an endless loop of the packet 160 being received at a plurality of full routing nodes 170 and encapsulated at each of those full routing nodes 170, the packet routing process 145-2, operating on the second full routing node 170-2, detects that the packet 160 has already been encapsulated (by the first full routing node 170-1) and refrains from encapsulating the packet 160 again.

In step 209, the packet routing process 145-2 transmits the packet 160 according to the header encapsulating the packet 160. The second full routing node 170-2 detects that the packet 160 has already been encapsulated, and transmits the packet 160, according to the header, toward the second node 165.

FIG. 6 is a flowchart of the steps performed by the packet routing process 145-2 when it identifies a full routing node 170 from a plurality of network devices 110.

In step 210, the packet routing process 145-2 identifies a full routing node 170 from a plurality of network devices 110. The full routing node 170 is capable of providing routing information for each of the nodes 150 within the plurality of network devices 110. The plurality of network devices 110 is comprised of a subset of nodes 150, and a subset of full routing nodes 170. The subset of nodes 150 is not capable of providing routing information for each of the nodes 150 within the plurality of network devices 110.

In step 211, the packet routing process 145-2 identifies the subset of full routing nodes 170 capable of providing routing information to the plurality of network devices 110. In an example embodiment, each of the nodes 150 within the plurality of network devices 110 is notified which network devices 110 are full routing nodes 170 by a process that notifies each network device 110 (i.e., both full routing nodes 170 and non full routing nodes 150) which network devices 110 are full routing nodes 170).

In step 212, the packet routing process 145-2 selects a preferred full routing node 170-1 from the subset of full routing nodes 170-N. The packet routing process 145-2, operating on each of the nodes 150 within the plurality of network devices 110, selects the preferred full routing node 170 to which to transmit the packet 160.

FIG. 7 is a flowchart of the steps performed by the packet routing process 145-2 when it selects a preferred full routing node 170-1 from the subset of full routing nodes 170.

In step 212, the packet routing process 145-2 selects a preferred full routing node 170-1 from the subset of full routing nodes 170. The packet routing process 145-2, operating on each of the nodes 150 within the plurality of network devices 110 selects the preferred full routing node 170 via a variety of methods, such as proximity, traffic, load balancing, etc.

In step 213, the packet routing process 145-2 identifies the preferred full routing node 170 based on a proximity of the preferred full routing node 170 with respect to the first node 150. In an example embodiment, the packet routing process 145-2 selects the full routing node 170 that is closest to the first node 155. In an example embodiment, the packet 160 arrives from the Internet, and the first node 155 is the provider edge (PE) router. The provider edge (PE) router selects the closest full routing node 170 to which to transmit the packet 160 as the first phase of the packet routing process 145-2.

In step 214, the packet routing process 145-2 identifies the preferred full routing node 170 based on a level of traffic associated with the preferred full routing node 170. In an example embodiment, the packet routing process 145-2 selects the full routing node 170 based on which full routing node 170 is not currently congested with other network traffic. In other words, the packet routing process 145-2 selects the full routing node 170 that is least congested with traffic from among the available full routing nodes 170.

In step 215, the packet routing process 145-2 identifies the preferred full routing node 170 based on a level of traffic existing between the first node 150, and the preferred full routing node 170. In other words, the full routing node 170-2 might not be congested with traffic, but the network path from the first node 155 to the full routing node 170-2 is congested. The packet routing process 145-2 selects a different full routing node 170-1 to perform the second phase of the packet routing process 145-2, that is, routing the packet 160 to the second node 165.

In step 216, the packet routing process 145-2 identifies the preferred full routing node 170 based on load balancing among the subset of full routing nodes 170. In an example embodiment, the packet routing process 145-2 performs load balancing to determine to which full routing node 170 to transmit the packet 160. Based on the result of the load balancing, the packet routing process 145-2 selects the preferred full routing node 170 from a plurality of available full routing nodes 170.

Figure 8:
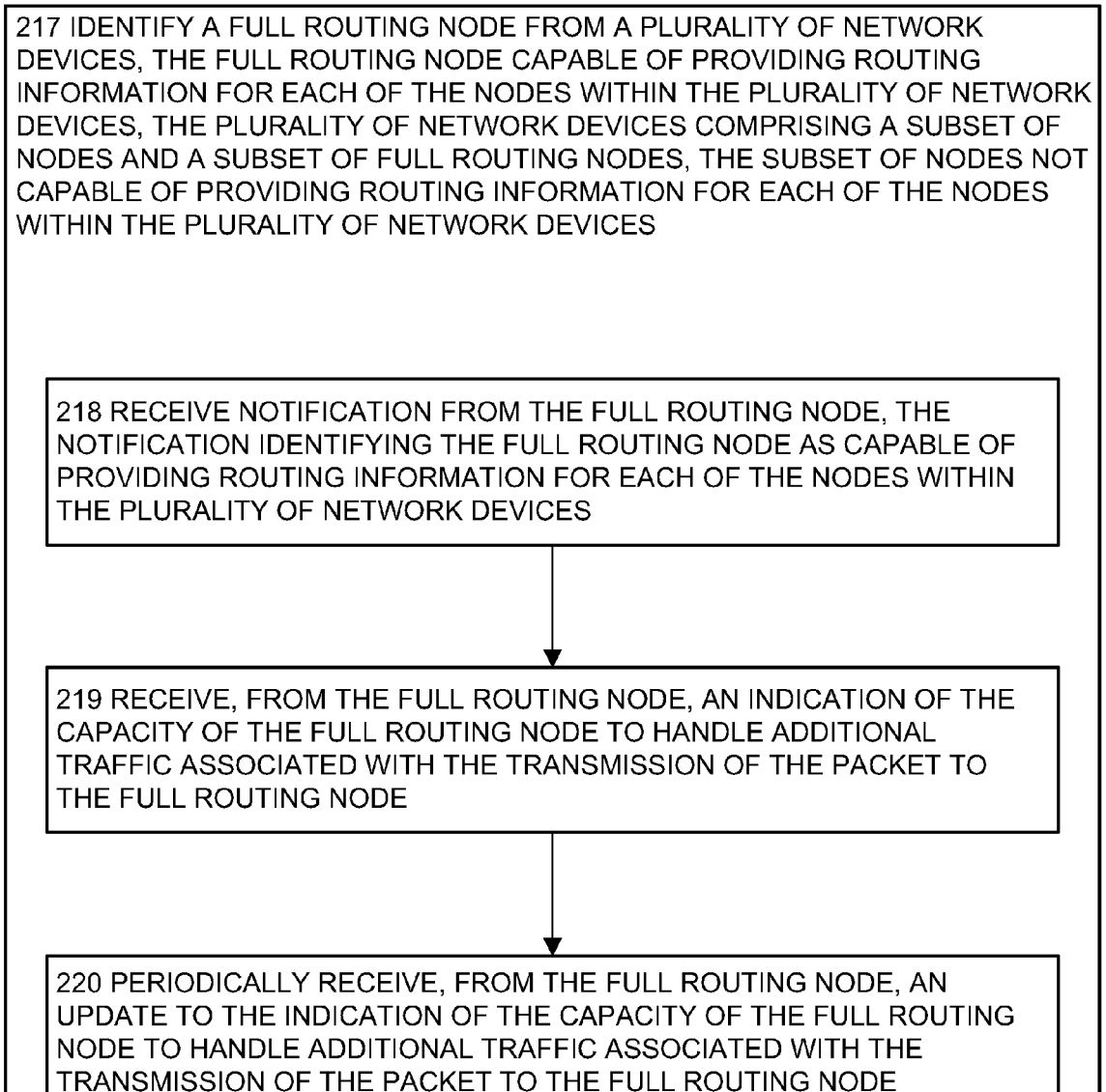
FIG. 8 illustrates a flowchart of a procedure performed by the system of FIG. 1 when the packet routing process identifies a full routing node from a plurality of network devices, and receives notification from the full routing node, according to one embodiment disclosed herein.

FIG. 8 is a flowchart of the steps performed by the packet routing process 145-2 when it identifies a full routing node 170 from a plurality of network devices 110.

In step 217, the packet routing process 145-2 identifies a full routing node 170 from a plurality of network devices 110. The full routing node 170 is capable of providing routing information for each of the nodes 150 within the plurality of network devices 110. The plurality of network devices 110 comprises a subset of nodes 150, and a subset of full routing nodes 170. The subset of nodes 150 is not capable of providing routing information for each of the nodes 150 within the plurality of network devices 110.

In step 218, the packet routing process 145-2 receives notification from the full routing node 170, identifying the full routing node 170 as capable of providing routing information for each of the nodes 150 within the plurality of network devices 110. In an example embodiment, the packet routing process 145-2, operating on the full routing node 170, transmits notification to the nodes 150, identifying which full routing node 170 are capable of providing routing information. The full routing nodes 170 notify the nodes 150 (i.e., the non full routing nodes 150) via router capability TLV notification. In an example embodiment, the router capability TLV notification contains a flag indicating whether or not a network device 110 (such as a node 150, or a full routing node 170) is capable of providing full routing information.

In step 219, the packet routing process 145-2 receives, from the full routing node 170, an indication of the capacity of the full routing node 170 to handle additional traffic associated with the transmission of the packet 160 to the full routing node 170. In an example embodiment, the router capability TLV notification also contains a watermark indicating a percentage of capacity the full routing node 170 currently has available to handle additional traffic.

In step 220, the packet routing process 145-2 periodically receives, from the full routing node 170, an update to the indication of the capacity of the full routing node 170 to handle additional traffic associated with the transmission of the packet 160 to the full routing node 170. In other words, each full routing node 170 periodically updates each of the nodes 150, within the plurality of network devices 110, with information associated with the status of the full routing node 170. In an example embodiment, each full routing node 170 also periodically updates each node 150 with information associated with the capacity to which each full routing node 170 is currently able to handle additional traffic. In another example embodiment, a full routing node 170 triggers an update (i.e., an update to each node 150) based on a change in an attribute associated with the full routing node 170.

FIG. 9 is a flowchart of the steps performed by the packet routing process 145-2 when it transmits the packet 160 to the full routing node 170 for future transmission to the second node 165.

In step 221, the packet routing process 145-2 transmits the packet 160 to the full routing node 170 for future transmission to the second node 165. The packet routing process 145-2 is a two phase process wherein a node 150 (such as a provider edge (PE) router) receives a packet 160, transmits the packet 160 to a full routing node 170 (the first phase of the two phase process). The provider edge (PE) router establishes a tunnel between the provider edge (PE) router and the full routing node 170. The full routing node 170 then establishes a tunnel between the full routing node 170 and the second node 165, and transmits the packet 160 toward the second node 165 (the second phase of the two phase process).

In step 222, the packet routing process 145-2 creates a header for the packet 160. The header indicates an interim destination of the packet 160. The interim destination is the full routing node 170.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method of routing packets, the method comprising:
    receiving a packet at a first node in an autonomous system (AS), the packet destined for a second node in the AS;
    identifying, at the first node, a full routing node from among a plurality of network devices in the AS based on the full routing node including Border Gateway Protocol (BGP) routing information for each of a plurality of nodes within the AS, the plurality of network devices comprising a subset of partial routing nodes and a subset of full routing nodes, the first node and the subset of partial routing nodes not including the BGP routing information for each of the nodes within the AS, the subset of full routing nodes including the BGP routing information for each of the nodes within the AS, the subset of full routing nodes including the full routing node, wherein the nodes within the AS include the network devices;
    transmitting the packet from the first node over a first tunnel to the full routing node based on identification of the full routing node as including the BGP routing information for each of the nodes in the AS; and
    routing the packet at the full routing node to the second node over a second tunnel.

2. The method of claim 1 wherein routing the packet at the full routing node comprises:
    receiving the packet at the full routing node;
    encapsulating the packet with a header directing the packet toward the second node; and
    transmitting the packet to the second node.

3. The method of claim 1 wherein routing the packet at the full routing node comprises:
    receiving the packet at the full routing node;
    determining the packet is encapsulated with a header directing the packet toward the second node;
    refraining from encapsulating the packet; and
    transmitting the packet according to the header encapsulating the packet.

4. The method of claim 1 wherein identifying the full routing node from among the plurality of network devices comprises:
    identifying the subset of full routing nodes; and
    selecting a preferred full routing node from among the subset of full routing nodes.

5. The method of claim 1 wherein identifying a full routing node from a plurality of network devices comprises:
    receiving notification from the full routing node, the notification identifying the full routing node as including the BGP routing information for each of the nodes within the AS.

6. The method of claim 1 wherein transmitting the packet to the full routing node for future transmission to the second node comprises:
    creating a header for the packet, the header indicating an interim destination of the packet, the full routing node identified as the interim destination.

7. The method of claim 1, wherein routing the packet at the full routing node to the second node over the second tunnel comprises performing an Internet Protocol (IP) lookup of an IP address in the packet at the full routing node and obtaining routing information for establishment of the second tunnel from the IP lookup of the IP address.

8. The method of claim 4 wherein selecting a preferred full routing node from the subset of full routing nodes comprises:
    identifying the preferred full routing node based on a proximity of the preferred full routing node with the first node.

9. The method of claim 4 wherein selecting a preferred full routing node from the subset of full routing nodes comprises:
identifying the preferred full routing node based on a level of traffic associated with the preferred full routing node.

10. The method of claim 4 wherein selecting a preferred full routing node from the subset of full routing nodes comprises:
identifying the preferred full routing node based on a level of traffic existing between the first node and the preferred full routing node.

11. The method of claim 4 wherein selecting a preferred full routing node from the subset of full routing nodes comprises:
identifying the preferred full routing node based on load balancing among the subset of full routing nodes.

12. The method of claim 5 further comprising:
receiving, from the full routing node, an indication of a capacity of the full routing node to handle additional traffic associated with transmission of the packet to the full routing node.

13. The method of claim 12 further comprising:
periodically receiving, from the full routing node, an update to the indication of the capacity of the full routing node to handle additional traffic associated with the transmission of the packet to the full routing node.

14. A system for routing packets, the system comprising:
a first computerized device; and
a second computerized device;
wherein the first computerized device is configured to perform the operations of:
receiving a packet from a first node in a first autonomous system (AS), the packet addressed to a second node in a second AS;
identifying the second computerized device from among a plurality of network devices without identifying, at the first computerized device, a route to the second node from the second computerized device, the network devices being within the first AS, the second computerized device including routing information received over a border gateway protocol (BGP) for each of at least one node in the second AS, the plurality of network devices comprising a subset of partial routing nodes and a subset of full routing nodes, the first computerized device and the subset of partial routing nodes failing to include the routing information received over the BGP for each of the at least one node in the second AS, each of the subset of full routing nodes including the routing information received over the BGP for each of the at least one node in the second AS, and the subset of full routing nodes including the second computerized device;
transmitting the packet from the first computerized device to the second computerized device over a first tunnel without identifying the route to the second node from the second computerized device, wherein transmitting the packet to the second computerized device is based on identification of the second computerized device as including the routing information received over the BGP for each of the at least one node in the second AS; and
wherein the second computerized device is configured to perform the operations of:
receiving the packet from the first computerized device over the first tunnel;
establishing a second tunnel on the route to the second node from the second computerized device; and
transmitting the packet to the second node over the second tunnel.

15. The system of claim 14, wherein the first computerized device is a provider edge router, and routing information for the second node that is included in the provider edge router is limited to next hop information.

16. A computerized device comprising:
a memory;
a processor;
a communications interface;
an interconnection mechanism coupling the memory, the processor and the communications interface;
wherein the memory is encoded with a packet routing application that, when executed on the processor, performs the operations of:
receiving a packet via the communications interface, the computerized device being a first node in an autonomous system (AS), the packet destined for a second node in the AS;
indentifying, at the first node, a full routing node from among a plurality of network devices in the AS based on the full routing node including Border Gateway Protocol (BGP) routing information for each of a plurality of nodes in the AS, the plurality of nodes in the AS including the plurality of network devices, the plurality of network devices comprising a subset of partial routing nodes and a subset of full routing nodes, the first node and the subset of partial routing nodes failing to include the BGP routing information for each of the plurality of nodes, the subset of full routing nodes including the BGP routing information for each of the plurality of the nodes, wherein the subset of full routing nodes includes the full routing node; and
transmitting the packet from the first node to the full routing node over a first tunnel established without knowledge of how to route the packet from the full routing node to the second node, wherein transmitting the packet is based on the full routing node being identified as including the BGP routing information for each of the plurality of nodes, and wherein the full routing node establishes a second tunnel from the full routing node to the second node.

17. The computerized device of claim 16 wherein the packet routing application is configured to perform the operation of identifying the full routing node from the plurality of network devices by performing the operations of:
identifying the subset of full routing nodes; and
selecting a preferred full routing node from the subset of full routing nodes.

18. The computerized device of claim 17 wherein the packet routing application, when executed by the processor, performs the operations of:
receiving, from the full routing node, an indication of a capacity of the full routing node to handle traffic associated with a transmission of the packet to the full routing node.

19. The computerized device of claim 18 wherein the packet routing application, when executed by the processor, performs the operations of:
periodically receiving, from the full routing node, an update to the indication of the capacity of the full routing node to handle the traffic associated with the transmission of the packet to the full routing node.

20. A non-transitory tangible computer readable storage medium encoded with computer programming instructions that, when executed by a processor in a computerized device, provides packet routing, the non-transitory tangible computer readable storage medium comprising:

instructions to receive a packet at a first node in an autonomous system (AS), the packet destined for a second node;

instructions to identify, at the first node, a full routing node from among a plurality of network devices in the AS based on the full routing node including Border Gateway Protocol (BGP) routing information for each of a plurality of nodes in the AS, the plurality of network devices comprising a subset of partial routing nodes and a subset of full routing nodes, the first node and the subset of partial routing nodes not including the BGP routing information for each of the nodes in the AS, wherein each node in the subset of full routing nodes is configured to include the BGP routing information for each of the nodes in the AS, wherein the subset of full routing nodes includes the full routing node; and instructions to transmit the packet from the first node to the full routing node over a first tunnel, without knowledge of a route to the second node from the full routing node, wherein the full routing node transmits the packet over a second tunnel from the full routing node to the second node.

* * * * *